US011616870B2

(12) United States Patent
Soffer et al.

(10) Patent No.: US 11,616,870 B2
(45) Date of Patent: Mar. 28, 2023

(54) ADD-ON DEVICE FOR SMARTPHONE THAT UTILIZES THE SMARTPHONE'S ANTENNAS

(71) Applicant: HIGH SEC LABS LTD., Caesarea (IL)

(72) Inventors: Aviv Soffer, Caesarea (IL); David Hirshberg, Haifa (IL)

(73) Assignee: HIGH SEC LABS LTD., Caesarea (IL)

( * ) Notice: Subject to any disclaimer, the term of this patent is extended or adjusted under 35 U.S.C. 154(b) by 0 days.

(21) Appl. No.: 17/859,065

(22) Filed: Jul. 7, 2022

(65) Prior Publication Data
US 2023/0024825 A1 Jan. 26, 2023

(30) Foreign Application Priority Data
Jul. 22, 2021 (IL) .......................................... 285080

(51) Int. Cl.
*H04M 1/02* (2006.01)
(52) U.S. Cl.
CPC ................................ *H04M 1/0274* (2013.01)
(58) Field of Classification Search
CPC ......... H04M 1/72577; H04M 1/72527; H04M 1/72569; H04M 1/0283; H04M 1/0274; G01G 7/00; G01G 19/52; G01G 21/28; H04B 1/3888
See application file for complete search history.

(56) References Cited

U.S. PATENT DOCUMENTS

| 7,876,272 | B2 * | 1/2011 | Dou ....................... H01Q 21/28 343/702 |
| 8,214,003 | B2 * | 7/2012 | Wong ................... H04B 1/3888 455/90.3 |
| 10,795,981 | B2 | 10/2020 | Nahamoni et al. |
| 2002/0187808 | A1 | 12/2002 | Vallstrom et al. |
| 2010/0264211 | A1* | 10/2010 | Jain ..................... H04W 12/062 235/380 |
| 2011/0287726 | A1* | 11/2011 | Huang ................. H04B 1/3883 455/90.3 |

(Continued)

FOREIGN PATENT DOCUMENTS

| EP | 2219353 | 8/2010 |
| IL | 272832 | 4/2021 |

(Continued)

*Primary Examiner* — Ernest G Tacsik
(74) *Attorney, Agent, or Firm* — AlphaPatent Associates, Ltd; Daniel J. Swirsky (57) ABSTRACT

A wireless communication system comprising a smartphone comprising antenna system, and an add-on device that is configured to be attached to the smartphone, wherein, the add-on device comprises, a wireless communication module configured to transmit and receive RF communication signals, and an antenna coupling system that couples between the wireless communication module and the smartphone's antenna system in order to at least transmit or receive the RF communication signals by the smartphone's antenna system, the antenna coupling system couples the RF communication signals by at least one of or the combination of (a) conduction with the enclosure of the smartphone, and (b) induction between the add-on device and the smartphone.

36 Claims, 7 Drawing Sheets

(56) References Cited

U.S. PATENT DOCUMENTS

| | | | |
|---|---|---|---|
| 2012/0303520 A1 | 11/2012 | Huang | |
| 2013/0102367 A1* | 4/2013 | Kong | H04M 1/7246 455/571 |
| 2014/0065948 A1 | 3/2014 | Huang | |
| 2015/0011273 A1* | 1/2015 | Wilmhoff | H01Q 9/285 343/702 |
| 2016/0043764 A1 | 2/2016 | Huang | |
| 2016/0072539 A1* | 3/2016 | Hu | H01Q 1/243 455/575.8 |
| 2016/0309007 A1* | 10/2016 | Irci | H01Q 1/243 |
| 2017/0134063 A1* | 5/2017 | Lee | H04M 1/724092 |
| 2018/0359351 A1* | 12/2018 | Zhao | H01M 50/284 |
| 2019/0095655 A1* | 3/2019 | Krawczewicz | H04L 9/3234 |
| 2019/0158136 A1* | 5/2019 | DiLella | H02J 7/0044 |
| 2020/0364352 A1 | 11/2020 | Soffer | |
| 2021/0266396 A1* | 8/2021 | Coverstone | H04B 1/3888 |

FOREIGN PATENT DOCUMENTS

| | | |
|---|---|---|
| WO | WO2014107582 | 7/2014 |
| WO | WO2019097511 | 5/2019 |
| WO | WO2021224905 | 11/2021 |

* cited by examiner

ADD-ON DEVICE FOR SMARTPHONE THAT UTILIZES THE SMARTPHONE'S ANTENNAS

FIELD OF THE INVENTION

The present invention, in some embodiments thereof, relates to add-on devices of a smartphone and more particularly, but not exclusively, to add-on devices that comprises wireless communication capabilities.

BACKGROUND OF THE INVENTION

Since smartphone as well as other mobile wireless devices gain popularity, the market of add-on devices that are coupled or physically attached to the smart phone flourish as well. Many kinds of add-on devices exist in the market, they include power packs, to extend the battery power capacity of the smartphone, add-on that add new or better sensing capacity to the smartphone like 3D or IR cameras, Ultrasound imager, enhanced microphone, security enhancement, and the like.

Some of the add-on devices require to use wireless communication capabilities. In many cases the wireless communication requirements are fulfilled by the smartphone communication capabilities itself. However, in some cases, independent wireless communication capabilities are required. For example, add-ons for upgrading wireless communication capabilities, e.g., from one cellular generation to a newer/higher cellular generation, will need its own wireless communication capabilities. Add-on device for enhancing wireless communication security will typically need its own wireless communication capabilities including having antennas on the add-on devices. An objective of this invention is to provide alternative way to implement the antenna system inside the add-on devices.

An example of a security enhancing add-on device that includes wireless communication capabilities and comprises antennas in the add-on device can be found in US patent publication No. 20200364352 entitled "Cellular phone security pack method and apparatus". Another example can be found in U.S. patent Ser. No. 10/795,981 entitled "Add-on modem for wireless devices and methods useful in conjunction therewith".

SUMMARY OF THE INVENTION

The present invention relates to an add-on device attached to a smartphone, or any other mobile device, that comprises wireless communication capabilities. According to the present invention the add-on device comprises wireless communication functionalities that include a modem but instead of having one or more antennas in the add-on device the add-on device uses one or more antennas in the smartphone by coupling the add-on device to the, typically conductive, antenna elements of the smartphone. The coupling is performed by a coupler element that can be either galvanically connected to conductive elements on the edges, i.e., the enclosure, of the smartphone (current conduction) or electromagnetic coupling by induction. The induction may be capacitive (electric) or inductive (magnetic) and in general is electromagnetic induction.

According to an aspect of some embodiments of the present invention there is provided a wireless communication system comprising: a smartphone comprising antenna system; and an add-on device that is configured to be attached to the smartphone, comprises: wireless communication module configured to transmit and receive RF communication signals; and antenna coupling system that couples between the wireless communication module and the smartphone's antenna system in order to at least transmit or receive the RF communication signals by the smartphone's antenna system, the antenna coupling system couples the RF communication signals by at least one of or the combination of conduction with the enclosure of the smartphone; and induction between the add-on device and the smartphone.

According to some embodiments of the invention, the add-on device is a security device comprises a cryptographic module.

According to some embodiments of the invention, the antenna coupling system comprises one or more pogo pins connected to a conductive rim of the smartphone.

According to some embodiments of the invention, the induction coupling comprises induction to at least one of or combination of conductive elements of the smartphone enclosure, and conductive elements of the smartphone's antenna system.

According to some embodiments of the invention, the add-on device's wireless communication module supports a plurality of RF ports.

According to some embodiments of the invention, the add-on device's wireless communication module supports a plurality of frequency bands.

According to some embodiments of the invention, a matching subsystem connected between the wireless communication module and the antenna coupling system.

According to some embodiments of the invention, the smartphone and the add-on device share ground via an interface connector of the smartphone.

According to some embodiments of the invention, the smartphone and the add-on device share ground via conduction with the enclosure of the smartphone.

According to some embodiments of the invention, the smartphone and the add-on device do not share ground.

According to some embodiments of the invention, the add-on device is a jacket, shell or envelope.

According to some embodiments of the invention, the smartphone comprises 4th or higher generation cellular communication and the add-on device comprises 5th or higher generation cellular communication.

According to an aspect of some embodiments of the present invention there is provided an add-on device for a smartphone comprising antenna system, the add-on device is configured to be attached to the smartphone and comprises: wireless communication module to transmit and receive RF communication signals; and antenna coupling system that couples between the wireless communication module and the smartphone's antenna system in order to at least transmit or receive the RF communication signals by the smartphone's antenna system, the antenna coupling system couples the RF communication signals by at least one of or the combination of: (a) conduction with the enclosure of the smartphone; and (b) induction between the add-on device and the smartphone.

According to some embodiments of the invention, the add-on device is security device comprises cryptographic module.

According to some embodiments of the invention, the antenna coupling system comprises one or more pogo pins connected to a conductive rim of the smartphone.

According to some embodiments of the invention, the induction coupling comprises induction to at least one of or combination of conductive elements of the smartphone enclosure, and conductive elements of the smartphone's antenna system.

According to some embodiments of the invention, the wireless communication module supports a plurality of RF ports.

According to some embodiments of the invention, the wireless communication module supports a plurality of frequency bands.

According to some embodiments of the invention, a matching subsystem connected between the wireless communication module and the antenna coupling system.

According to some embodiments of the invention, the smartphone and the add-on device share ground via an interface connector of the smartphone.

According to some embodiments of the invention, the smartphone and the add-on device share ground via conduction with the enclosure of the smartphone.

According to some embodiments of the invention, the smartphone and the add-on device do not share ground.

According to some embodiments of the invention, the add-on device is a jacket, shell or envelope.

According to some embodiments of the invention, the smartphone comprises 4th or higher generation cellular communication and the add-on device comprises 5th or higher generation cellular communication.

According to an aspect of some embodiments of the present invention there is provided a method for using an antenna system of a smartphone by an add-on device that is configured to be attached to the smartphone, the add-on device comprises: a wireless communication module; and antenna coupling system, the method comprises: performing at least one of or the combination of (1) transmitting RF communication signals from wireless communication module to the antenna coupling system, and (2) receiving RF communication signals from the antenna coupling system to the wireless communication module; and coupling between the wireless communication module and the smartphone's antenna system by at least one of or the combination of: (a) conduction with the enclosure of the smartphone; and (b) induction between the add-on device and the smartphone, whereby the add-on device transmit and/or receive the RF communication signals by the smartphone's antenna system.

According to some embodiments of the invention, the add-on device is security device comprises cryptographic module.

According to some embodiments of the invention, the antenna coupling system comprises one or more pogo pins connected to a conductive rim of the smartphone.

According to some embodiments of the invention, the induction coupling comprises induction to at least one of or combination of conductive elements of the smartphone enclosure, and conductive elements of the smartphone's antenna system.

According to some embodiments of the invention, the add-on device's wireless communication module supports a plurality of RF ports.

According to some embodiments of the invention, the add-on device's wireless communication module supports a plurality of frequency bands.

According to some embodiments of the invention, a matching subsystem is connected between the wireless communication module and the antenna coupling system.

According to some embodiments of the invention, the smartphone and the add-on device share ground via an interface connector of the smartphone.

According to some embodiments of the invention, the smartphone and the add-on device share ground via conduction with the enclosure of the smartphone.

According to some embodiments of the invention, the smartphone and the add-on device do not share ground.

According to some embodiments of the invention, the add-on device is a jacket, shell or envelope.

According to some embodiments of the invention, the smartphone comprises 4th generation cellular communication and the add-on device comprises 5th generation or higher cellular communication.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

With specific reference now to the drawings in detail, it is stressed? that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 10A-10D are schematic diagrams of several different induction coupling approaches;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The present invention, in some embodiments thereof, relates to an add-on device of a smartphone and more particularly, but not exclusively, to add-on device that comprises wireless communication capabilities. According to the present invention the add-on device comprises wireless communication functionalities that include a modem but instead of having one or more antennas of the add-on device, the add-on device uses the one or more antennas of the smartphone by coupling the add-on device to the (conductive) antenna elements of the smartphone. The coupling is performed by a coupler element that can be either galvanically connected to conductive elements on the edges of the smartphone (current conduction) or electromagnetic coupling by induction. The induction may be either based on capacitive nature, i.e., done by an electric field, or inductive nature, i.e., done by magnetic field, or both.

As used herein, the term "smartphone" means any mobile electronic device with computing and communication capabilities, such as, telephony-centric, like mobile phone, smartphone, cellphone, cellular phone, computing-centric, such as, laptop computer, notebook computer, tablet or Personal Digital Assistant (PDA), data-communication-centric, such as, mobile terminal, portable media players/displays and any other similar portable, battery powered, and wireless communication supporting electronic device.

As used herein, the term "add-on device" means any mobile or portable device that is connected, attached or coupled to the smartphone to perform extended functionality such as but not limited to, access or save external data, communicate through alternative communication channels, encrypt or decrypt data, provide additional input or output user interface, provide additional sensing and computing capabilities, for example, portable medical imaging, provide additional power, such as, portable power packs (also known as external batteries or external chargers), or the like. An alternative name to the add-on device is a "peripheral device". When the smartphone is inserted into the add-on device or the peripheral device or wrapped partially or fully by the peripheral device, it might be referred as "jacket" or "sleeve". The terms "add-on device", "peripheral device", "jacket" or "sleeve" are essentially mean the same with respect to the present invention.

Figure 1:
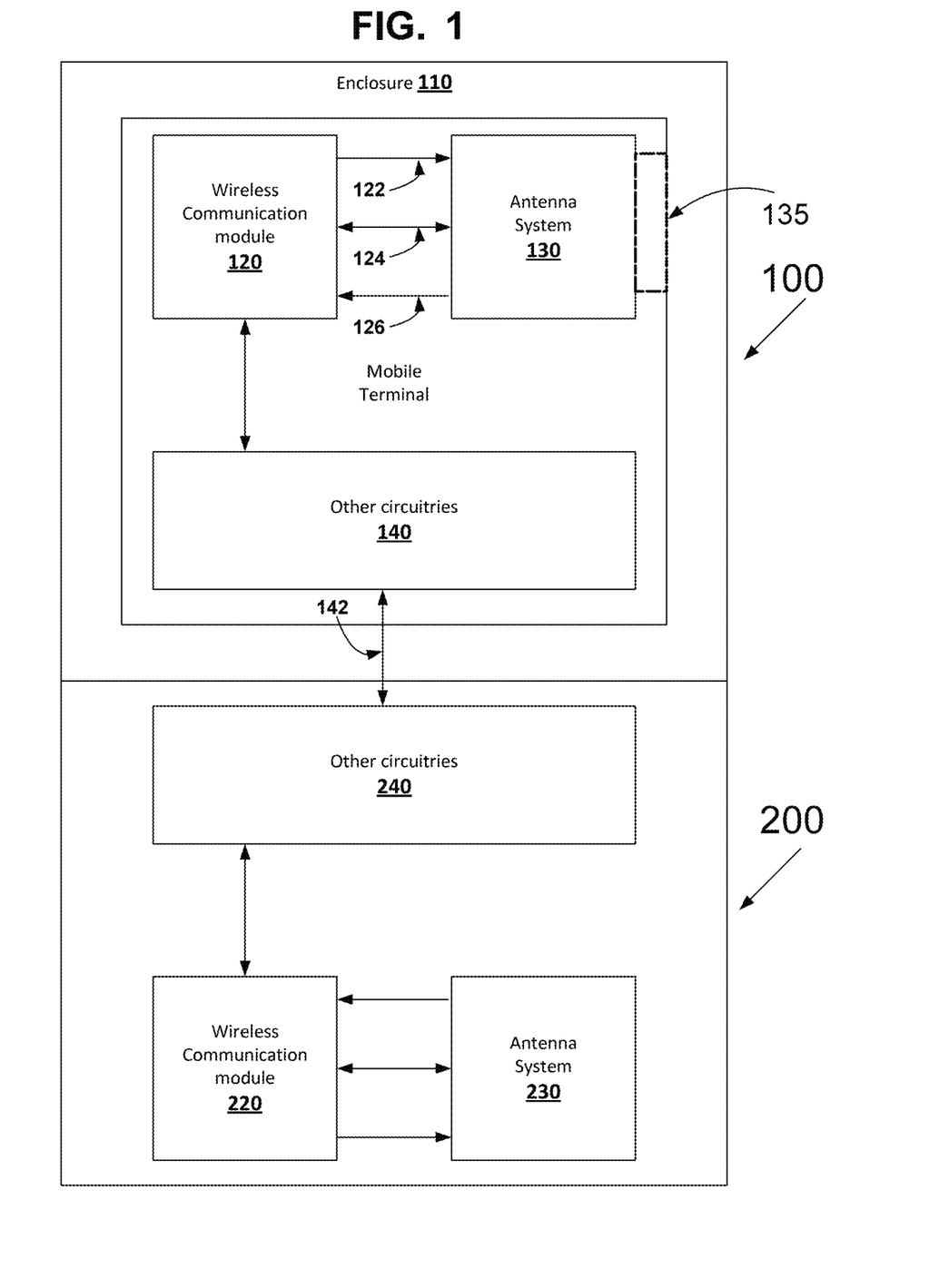
FIG. 1 is a simplified block diagram of a smartphone or any other mobile terminal with add-on device.

Reference is now made to FIG. 1. FIG. 1 is a simplified block diagram of a smartphone 100 or any other mobile terminal with add-on device 200. Smartphone 100 comprises an enclosure 110, wireless communication module 120, antenna system 130 and other circuitries 140. Smartphone 100 interacts wirelessly with one or more networks, such as, the cellular network, e.g., using 2G, 3G, 4G, 5G, or the like, cellular standards, local networks, such as, Wi-Fi, Wi-MAX or the like, personal network, such as, Bluetooth, NFC or the like, as well as other wireless services such as GPS, Radio broadcast services and the like.

Wireless communication module 120, also may be referred as the modem, convert digital data to RF signals and/or RF signals to digital data. Wireless communication module 120 may support a single communication protocol or many communication protocols, simultaneously or alternately in time. Wireless communication module 120 may comprises multiple modems, i.e., support in multiple communication standard or functions or capabilities. Wireless communication module 120 may support one or more RF signals. The RF signals are transmitted or received from antenna system 130. Antenna system 130 may comprise one or more antennas. It should be noted that a single antenna may be used for several different RF signals, e.g., a single antenna that support multiple frequency band, one for cellular and one for Wi-Fi. On the other hand, multiple antennas may be used for a single communication standard, e.g., in MIMO communication.

Overall, wireless communication module 120 supports one or more RF ports connected to one or more RF port of the antenna system 130. The RF connection between wireless communication module 120 and antenna system 130 may be transmit only connection 122 transmit and receive connection 124 or receive only connection 126. RF connections 122, 124 and 126 may have two conductive elements: RF Feed and RF Ground, or in short, Feed and GND. In some embodiments of the invention RF connections 122, 124 and 126 may have a single RF feed connection to the antenna while the ground connection is made using a common ground of the wireless communication module 120 and the antenna system 130. Antenna system 130 comprises one or more conductive elements and may comprise ground elements or ground plane as well as some additional matching elements such as capacitors and inductors. To achieve good conversion efficiency, i.e., conversion from RF signal power to electromagnetic radiation power, the antenna should not be significantly smaller than a quarter of the wavelength of the electromagnetic radiation. This poses a challenge to the smartphone design, especially in the communication bands with low frequencies. To overcome it, smartphone's antenna system 130 may use part of the enclosure 110 as antenna elements. The galvanic connection between the antenna system 130 and the enclosure 110 is illustrated by element 135 in FIG. 1. Note that this element is only symbolic and can have one or more sub elements that may be spread all over enclosure 110.

Smartphone's 100 other circuitries 140 typically comprises one or more processing modules, one or more memory modules that may be volatile, such as, SRAM or DRAM or non-volatile such as Flash memory and the like. Other circuitries 140 may further comprises sensors, such as, cameras and accelerometers, interfaces and ports such as USB or SIM card socket or the like, power sources, such as, rechargeable battery or the like, power management module, UI elements, etc.

Add-on device 200 is physically attached to Smartphone's enclosure 110. For example, add-on device 200 may be a jacket or a shell that envelops smartphone 100. Alternatively, add-on device may be a dongle that connects to one of smartphone's 100 ports, e.g., a bottom side extender to the smartphone body that connect to the bottom USB connector in a typical smartphone design.

Add-on device 200 comprises wireless communication module 220 and antenna system 230. In addition, Add-on device 200 comprises other circuitries 240 that may transfer data with smartphone 100 using interface 142. In an exemplary embodiment of the invention, interface 142 may be USB type C connector.

Wireless communication module 220 may be similar to wireless communication module 120. For example, in US patent publication No. 20200364352 entitled "Cellular phone security pack method and apparatus" add-one 200 is a secure communication jacket that replace the communication function of smartphone 100 with a secure cryptographic communication while neutralizing wireless communication module 120.

In this exemplary add-on device, the other circuitries 240 comprises at least the cryptographic module. The wireless communication module 220 and antenna system 230 are provided as illustrated in FIG. 1 and replace smartphone's wireless communication module 120, antenna system 130.

In an exemplary embodiment of the invention, the wireless communication capability of the smartphone is $3^{rd}$, $4^{th}$ or $5^{th}$ generation cellular communication and add-on device provide additional wireless communication capabilities, such as $4^{th}$ or $5^{th}$ or higher generation cellular communication. For example, an add-on device 200 with a modem supporting 5G communication is coupled with smartphone 100 with internal modem that supports only 4G communication. In this case, the add-on device is upgrading the communication capability of the smartphone.

Designing a good add-on's antenna system 230 is a challenging task especially since while attached to the smartphone, the existing smartphone's antenna system 130 may interfere and degrade the performance antenna system 230.

Figure 2:
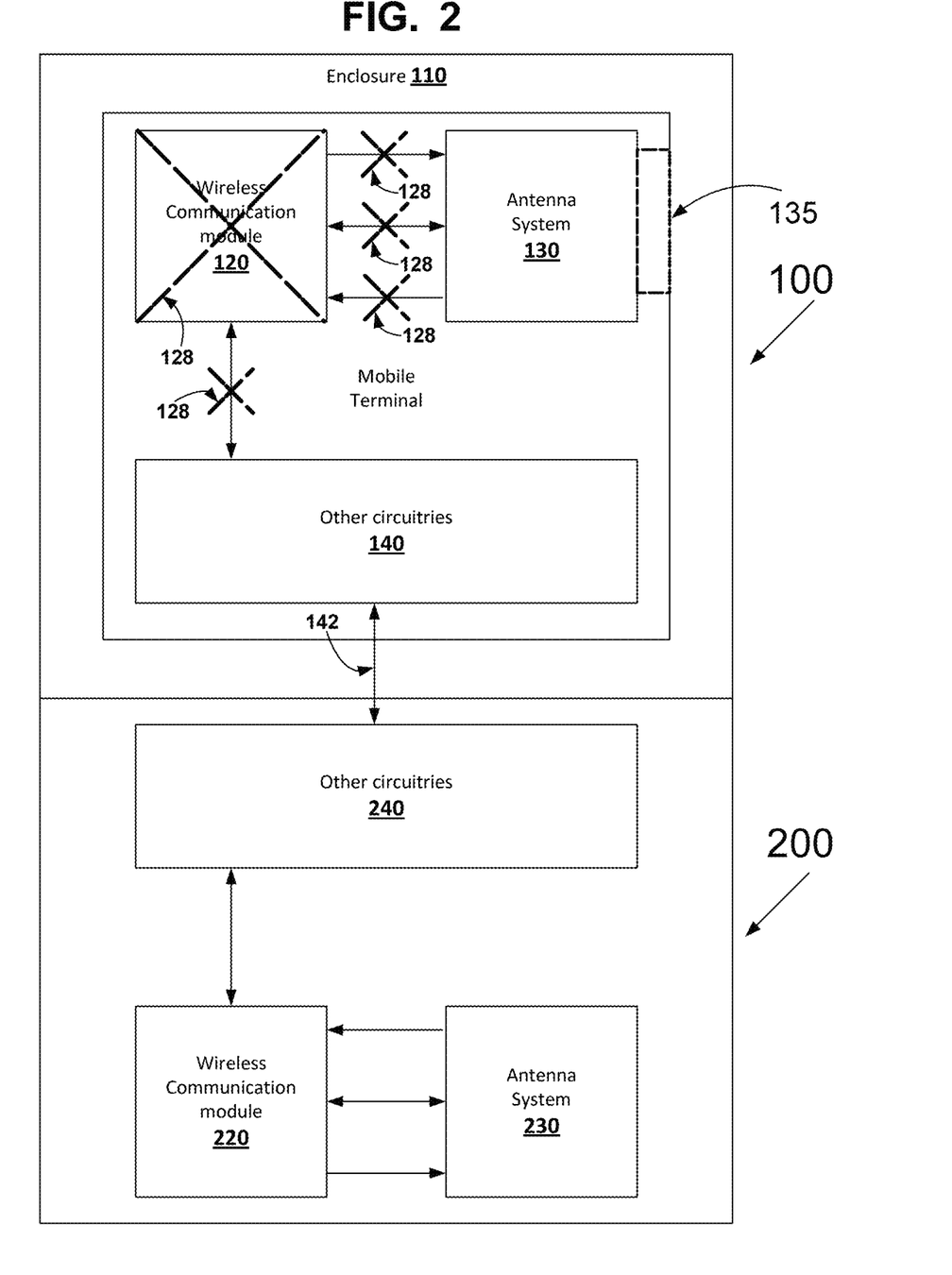
FIG. 2 is a simplified block diagram of the system of FIG. 1, where the communication capabilities of the smartphone are neutralized.

In FIG. 2, the neutralization of the smartphone 100 is illustrated. The neutralization 128 (illustrated by a dashed X) may be performed by cutting the data connection to the wireless communication module 120, by disabling wireless communication module 120, e.g., extract the modem IC from the smartphone's PCB, or by cutting the RF connections.

Figure 3:
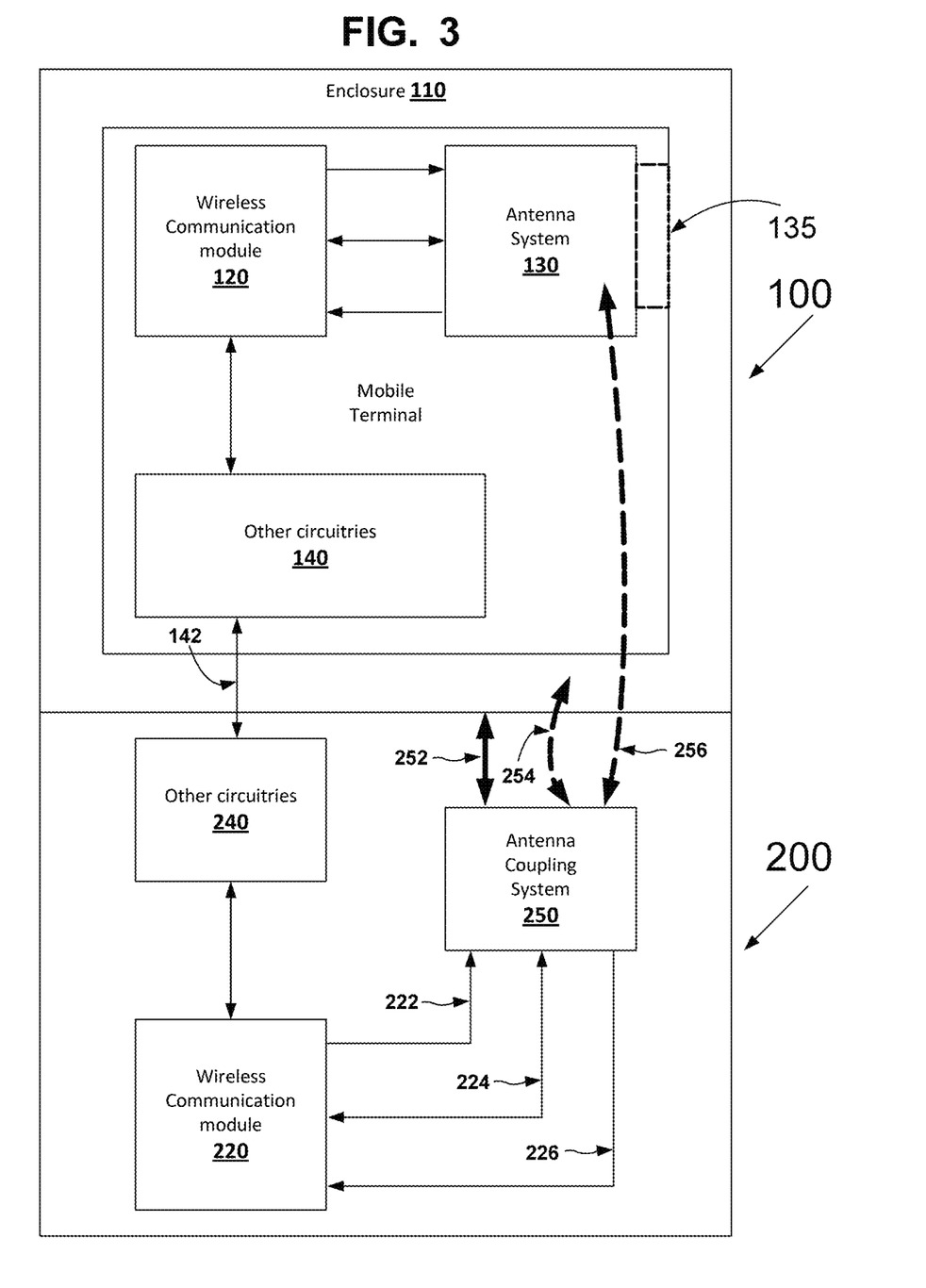
FIG. 3 is a simplified block diagram of a smartphone with add-on device that uses the smartphone's antenna system instead of designing a new antenna system in the add-on device, in accordance to the present invention.

Reference is now made to FIG. 3. The current figure teaches how to use the smartphone's 100 antenna system 130 instead of designing a new antenna system 230 in the add-on device 200 for receiving or transmitting the RF signals to/from add-on's wireless communication module 220. In order to do this, an antenna coupling system 250 is added to add-on device 200 instead of antenna system 230. The advantages of the antenna coupling system 250 is that it is much smaller than antenna system 230, it is easier to design, cheaper to implement and it leverage the design and manufacturing efforts performed in smartphone's antenna system 130.

Similar to smartphone's wireless communication module 120, add-on's wireless communication module 220 supports one or more RF ports connected to one or more RF port of the antenna coupling system 250. These RF connections may be transmit-only connections 222, transmit and receive connections 224, and/or receive-only connections 226. RF connections 222, 224 and 226 may have two conductive elements: Feed and GND or may have a single RF feed connection while the ground connection is made using a common ground for the wireless communication module 220 and the antenna coupling system 250. Additionally or alternatively, the ground of the wireless communication module 220 is connected to the add-on 200 ground, and optionally, to the smartphone 100 ground as well. In yet another exemplary embodiment of the invention, add-on 200 ground, and smartphone 100 ground are not shared, i.e., not connected.

Antenna coupling system 250 comprises conducting elements that are design to couple the RF energy between wireless communication module 220 and antenna system 130. As will be described next, the coupling is achieved without using any connectors or ports in smartphone 100 or add-on device 200 and without any modifications in smartphone 100. The coupling is done either by current conduction between the antenna coupling system 250 and conductive elements exist on enclosure 110 (this coupling is illustrated by arrow 252 in FIG. 3) or by electric, magnetic or electromagnetic induction between the antenna coupling system 250 and conductive elements that exist on enclosure 110 (illustrated by arrow 254) and/or between the antenna coupling system 250 and conductive elements that exist on antenna system 130 (illustrated by arrow 256).

The induction coupling (254 and/or 256) may be performed by capacitive nature, wherein a conducting element of antenna coupling system 250 is in close proximity and planar overlap with a conducting element of enclosure 110 or a conducting element of antenna system 130. In this capacitive nature case, the energy is mainly transferred by the electric field.

The induction coupling (254 and/or 256) may be performed by inductive nature, wherein a current flow in a wire, a loop or a coil of antenna coupling system 250 is in close proximity to another wire, loop or coil of enclosure 110 or antenna system 130. In this inductive nature case, the energy is mainly transferred by the magnetic field.

The induction coupling (254 and/or 256) may be through mixed electromagnetic nature, wherein the antenna coupling system 250 element and enclosure 110 element or antenna system 130 element transfer the energy by combination of both electric and magnetic fields.

Antenna coupling system 250 may support coupling to multiple antennas and multiple frequency bands of smartphone 100. It should be noted that single antenna coupling system 250 port may be used for coupling to several different antennas. On the other hand, multiple antennas coupling system 250 ports may be used for coupling to a single antenna in antenna system 130, and all other combinations in between are possible as well.

In an exemplary embodiment of the invention, a single wireless communication module 220 port is connected to a single antenna coupling system 250 port that couples to a single antenna in antenna system 130, wherein the antenna is a single frequency band antenna.

In another exemplary embodiment of the invention, two wireless communication module 220 ports, each supporting two different frequency bands, are connected to a single antenna coupling system 250 port that couples to two antennas in antenna system 130, wherein each antenna is supporting a different frequency band.

In yet another exemplary embodiment of the invention, a single wireless communication module 220 port is connected to a single antenna coupling system 250 port that couples to multiple antennas in antenna system 130.

In an exemplary embodiment of the invention, matching circuitries are inserted between wireless communication module 220 and antenna coupling system 250.

In an exemplary embodiment of the invention, there is provided a wireless communication system comprising: a smartphone 100 comprising antenna system 130; and an add-on device 200 that is configured to be attached to the smartphone, wherein, the add-on device 200 comprises: wireless communication module 200 configured to transmit and receive RF communication signals; and antenna coupling system 250 that couples between the wireless communication module 220 and the smartphone's antenna system 130 in order to at least transmit or receive the RF communication signals by the smartphone's antenna system 130. The antenna coupling system couples the RF communication signals by at least one of or the combination of: (a) conduction with the enclosure of the smartphone 252; and (b) induction between the add-on device and the smartphone 254/254.

In an exemplary embodiment of the invention, an add-on device for a smartphone comprising antenna system 130 is provided. The add-on device 200 is configured to be attached to the smartphone and comprises: wireless communication module 220 to transmit and receive RF communication signals; and antenna coupling system 250 that couples between the wireless communication module 220 and the smartphone's antenna system 130 in order to at least transmit or receive the RF communication signals by the smartphone's antenna system 130. The antenna coupling system couples the RF communication signals by at least one of or the combination of: (a) conduction with the enclosure of the smartphone; and (b) induction between the add-on device and the smartphone.

In an exemplary embodiment of the invention, a method for using an antenna system 130 of a smartphone 100 by an add-on device 200 that is configured to be attached to smartphone 100 is provided. The add-on device 200 comprises: wireless communication module 220; and antenna coupling system 250, the method comprises: performing at least one of or the combination of (1) transmitting RF communication signals from wireless communication module 220 to the antenna coupling system 130, and (2) receiving RF communication signals from the antenna coupling system 130 to the wireless communication module 220; and coupling between the wireless communication module 220 and the smartphone's antenna system 130 by at least one of or the combination of: (a) conduction with the enclosure of the smartphone; and (b) induction between the add-on device and the smartphone, whereby the add-on device 200 transmit and/or receive the RF communication signals by the smartphone's 100 antenna system 130.

Figure 4:
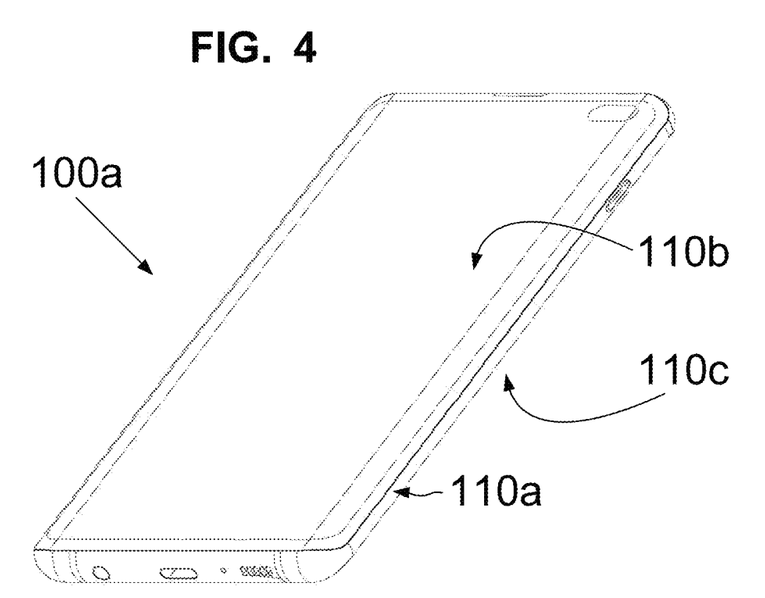
FIG. 4 is an isometric view of a smartphone, in accordance to the present invention.

Reference is now made to FIG. 4. FIG. 4 is an isometric view of a smartphone 100*a*. In an exemplary embodiment of the invention, the smartphone's enclosure 110 comprises three parts: rim 110*a*, top case 110*b* and bottom case 110*c*. Rim 110*a* is made from conductors, e.g., metallic material, while cases 110*b* and 110*c* are made of non-conductive materials that are transparent to electromagnetic RF signals, e.g., glass, ceramics, plastics or the like. Top case 110*b* is typically made of light transparent material, e.g., glass, and the smartphone's 100*a* display and touch screen are located thereunder.

Smartphone's 100*a* antenna system 130 is located partially inside enclosure 110 and may comprises a plurality of conductive elements such as printed antenna elements, e.g., dipoles, loops and the like, ground planes, etc. In addition, Smartphone's 100*a* antenna system 130 comprises the rim 110*a*. Rim 110*a* may be galvanically connected to other antenna system 130 elements, such as ground planes in smartphone's PCB or as part of the smartphone frame that is physically attached to rim 110*a*. In some embodiments, rim 110*a* is a part of the smartphone frame that hold all other smartphone elements, such as, a PCB, a camera, sensors, and the like.

Figure 5:
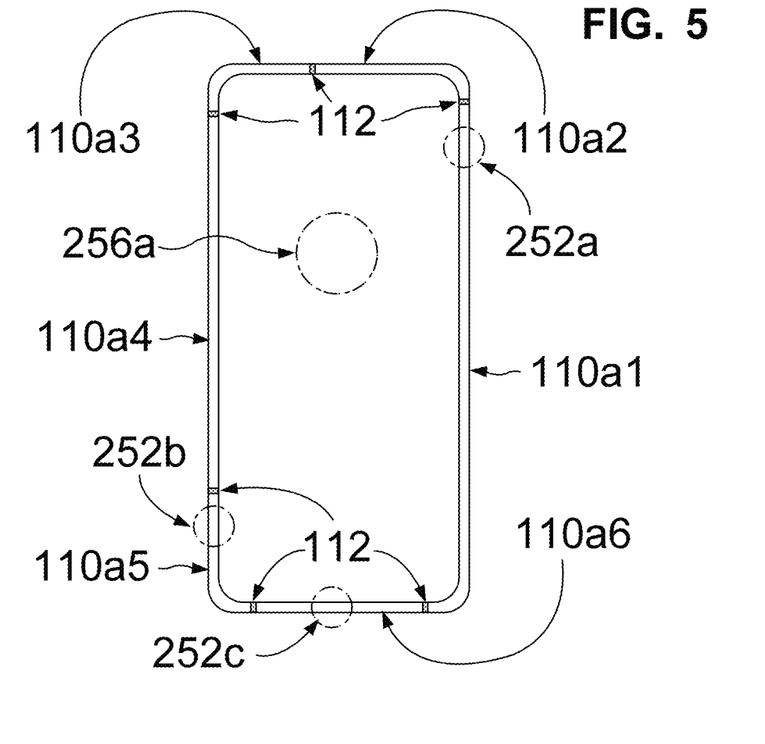
FIG. 5 is a simplified top view of the rim of the smartphone illustrated in FIG. 4, in accordance to the present invention.

Reference is now made to FIG. 5. FIG. 5 is simplified top view of rim 110*a* of smartphone 100*a*. To implement several elements of antenna system 130, rim 110*a* is partitioned into a plurality of segments 110*a*1-110*a*6 (6 segments are shown in this example). The segments are separated by thin isolator spacers 112. It should be noted that the following exemplary embodiment is based on this specific exemplary smartphone 100*a* to demonstrate a specific implementation of the invention, however, with the proper modifications any other smartphone or, in general, mobile terminal may be utilized as the antenna system for the add-on device. To implement a conductive coupling 252 the add-on device 200 may contact to areas on rim 110a. For example, as will be shown next, the add-on device 200 may contact areas 252a, 252b on rim 110a. Any other areas of the rim, like 252c, may be used for contact. In other embodiments of the invention, induction coupling may be used. For example, induction coupling may be provided through the area designated on FIG. 5 as area 256a.

Figure 6:
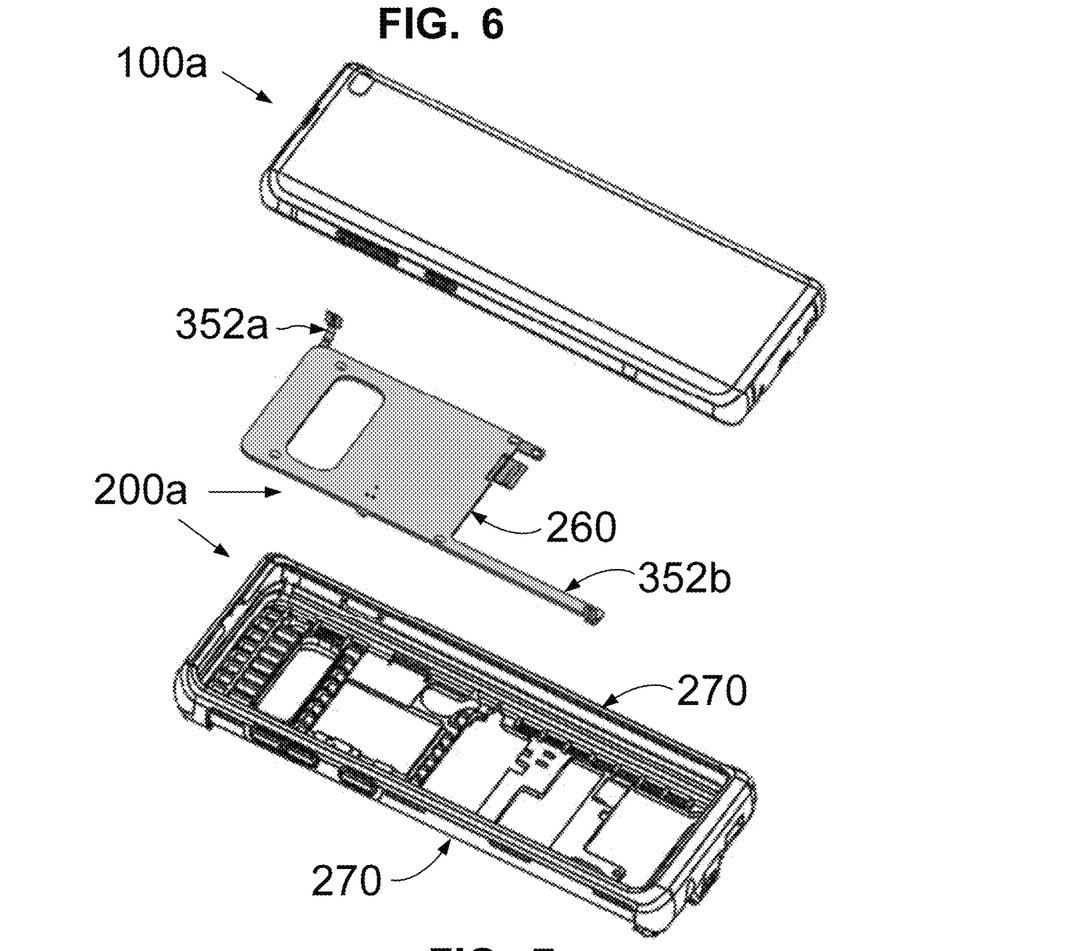
FIG. 6 is an exploded view of system that comprises the smartphone of FIG. 4 and an add-on device, in accordance to the present invention.

Reference is now made to FIG. 6. FIG. 6 is an exploded view of system that comprises the smartphone 100a and add-on device 200a. Add-on device 200a comprises a PCB 260 and a jacket 270. For sake of clarity, other elements of add-on device that are not related to the current invention have been omitted from the drawing. Jacket 270 is built from flexible materials, such as, rubber or the like. Jacket 270 is configured to receive and couple smartphone 100a by snapping the smartphone 100a into Jacket 270. Inside jacket 270, PCB 260 is physically coupled by snaps, screws or the like, to the jacket. PCB 260 comprises wireless communication module 220 and antenna coupling system 250. The wireless communication module 220 typically comprises one or more ICs, e.g., a modem IC soldered on PCB 260 (not shown in the figure). Antenna coupling system 250 comprises two arms 352a and 352b. Arm 352a comprises flexible PCB strip connected to PCB 260. Arm 352a flexible PCB far end, i.e., the tip of the flexible PCB strip, comprises pogo pin. The pogo pin, or a spring-loaded pin, i.e., pin with a spring, is pushing the pin against the smartphone's rim whenever the smartphone is inserted into the jacket to enhance the galvanic contact. The pogo pin is configured to contact rim 110a in area 252a. The flexible PCB strip comprises a conductive trace that galvanically connect between the RF output of the wireless communication module 220 and the pogo pin. Optionally, the trace is configured as RF transmission line. Optionally, flexible PCB strip and its tip are guided into a matching cavity in jacket 270.

Similarly, arm 352b comprises a strip that is part of PCB 260 connected at the end to a flexible PCB strip with a pogo pin attached to the tip of the flexible PCB strip. The pogo pin is configured to contact rim 110a in area 252b.

Both arms, 352a and 352b, demonstrate conductive coupling 252 between antenna coupling system 250 and enclosure 110.

In an exemplary embodiment of the invention, arm 352a is connected to the RF feed port and arm 352b is connected to GND.

In an exemplary embodiment of the invention, arm 352a is connected to a first RF feed port and arm 352b is connected to a second RF feed port. The GND port is connected to a third arm that is configured to contact area 252c in rim section 110a6 (not shown in the Figure). Optionally or alternatively, the GND port is connected to interface 142 ground pin, e.g., USB connector ground.

Figure 7:
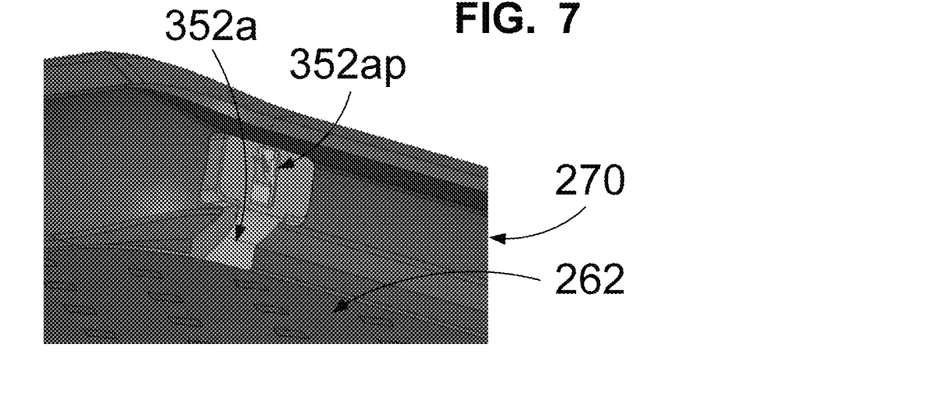
FIG. 7 is an isometric partial zoom-in view of add-on device of FIG. 6, in accordance to the present invention.

Reference is now made to FIG. 7. FIG. 7 is isometric partial view of add-on device 200a. The view is a zoom-in into the area that comes into contact with contact area 252a of smartphone 100a. PCB 260 (covered by isolating sheet 262 in the figure) is assembled to jacket 270. Arm 352a is positioned in the match cavity in jacket 270 and when smartphone 100a is slide into jacket 270, pogo pin 352a, by the cantilever spring mechanism, is pushed against area 252a of segment 110a1 of rim 110a. When pushed, pogo pin 352a creates conduction coupling between add-on device 200a and smartphone 100a. In some embodiment, rim 110a may be coated with thin insolating coating. In this case, a grinding in the rim area may be performed to expose the conductive material of the rim. Additionally or alternatively, a concave recess may be drilled or milled in the desired contact point on the smartphone's rim, while a matching shape is used on the pogo pin to ensure a good galvanic contact. For example, the tip shape and the recess geometry may be a cone, a hemisphere or the like.

In an exemplary embodiment of the invention, the tip, i.e., the far end, of arm 352a, instead of a pogo pin, comprises a conductive material with geometry shape such as, plane, circle, rectangle or the like. The tip may not contact rim 110a but reside in close proximity in parallel to the rim. Optimally, an insulator layer is provided between the tip of the arm and the rim. In this embodiment, the RF energy passes from add-on device 200a to smartphone 100a by induction 254. The RF energy may be radiated through the rim or coupled through the rim to another radiating element in antenna system 130 of smartphone 100a.

Figure 8:
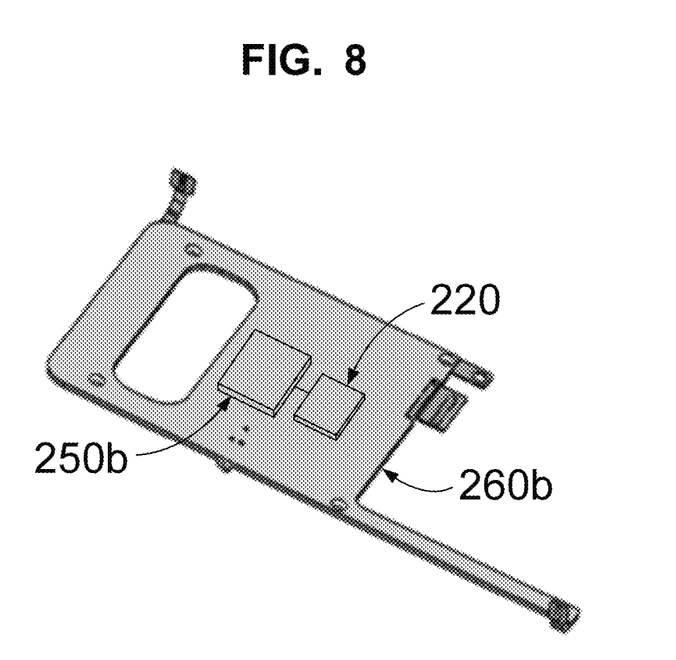
FIG. 8 is an isometric view of another PCB embodiment of the add-on device of FIG. 6, in accordance to the present invention.

Reference is now made to FIG. 8. FIG. 8 is isometric view of another embodiment of PCB 260, i.e., PCB 260b, of add-on device 200a. In this exemplary embodiment, PCB 260b is having antenna coupling system 250, and in specific, antenna coupling system 250b that use induction coupling 256 to elements of antenna system 130 in area 256a. PCB 260b of add-on device 200a comprises wireless communication module 220, e.g., a modem IC. Wireless communication module IC 220 is connected to antenna coupling system 250b. Antenna coupling system 250b may comprises at least one of or any combination of one or more ICs, conductive elements printed on PCB 260b, components such as coils and capacitors and the like. Antenna coupling system 250b is designed to provide a good induction coupling between antenna coupling system 250b and one or more elements of antenna system 130.

Figure 9:
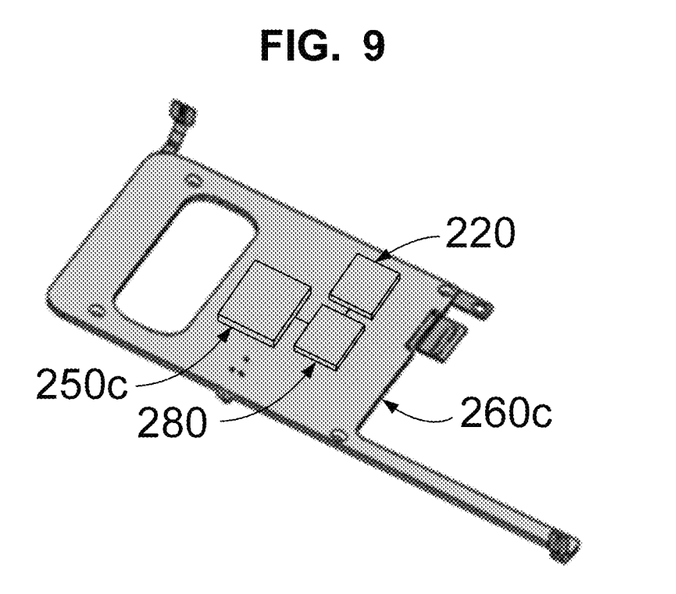
FIG. 9 is an isometric view of yet another PCB embodiment of the add-on device of FIG. 6, in accordance to the present invention.

Reference is now made to FIG. 9. FIG. 9 is an isometric view of another embodiment of PCB 260 of add-on device 200a. In this exemplary embodiment, PCB 260c is having antenna coupling system 250, and in specific, antenna coupling system 250c that use induction coupling 256 with elements of antenna system 130 in area 256a as well.

In specific, this embodiment comprises matching subsystem 280 between wireless communication module 220 and antenna coupling system 250c. Matching subsystem 280 may have multi frequency bands and multi ports to support coupling to plurality of antennas in smartphone 100a.

Matching subsystem 280 may comprises at least one of or any combination of one or more ICs, conductive elements printed on PCB 260c, components such as coils and capacitors and the like. Matching subsystem 280 is designed to optimize the matching between the wireless communication module 220 and the overall RF transmission performance determined by the combined characteristics of antenna coupling system 250c, induction coupling 256 and antenna system 130. Optimizing the matching is achieved by reducing the return losses of transmitted RF signals from wireless communication module 220 in the desired frequency bands, which by reciprocal principle, will provide the optimize power efficiency in reception as well.

In an exemplary embodiment of the invention, matching subsystem 280 may be dynamic, i.e., its impedance may change over time due to the actual conditions and RF frequencies that are used momentarily. Matching subsystem 280 might be controlled by digital circuitries, microcontroller or by using a control loop that measure parameters such as the return loss or the like to optimize the matching performance.

Figure 10A:
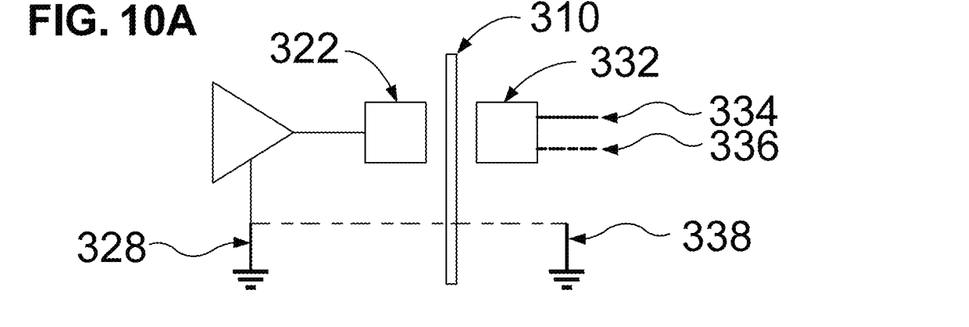
FIG. 10A is a schematic diagram illustrating a capacitive induction approach, in accordance to the present invention.

Reference is now made to FIGS. 10A-10D. FIGS. 10A-10D are schematic diagrams of several different induction coupling approaches. FIG. 10A is a schematic diagram of capacitive induction approach. The non-conductive gap between smartphone 100 and add-on device 200 is represented by element 310. non-conductive gap may be comprised from at least one of air gaps, non-conductive case elements of smartphone 100 and non-conductive case elements of add-on device 200.

The RF feed of wireless communication module 220 is connected to conductive element 322 that is located in proximity to gap 310. In the side of the smartphone there is conductive element 332 that creates a capacitive coupling with element 322. Conductive element 322 and conductive element 332 are located in proximity to each other on either side of the gap. Element 332 may transfer the RF power from element 322 to other elements in smartphone's antenna system 130 by conduction 334 or induction 336. Ground 328 of wireless communication module 220 may be connected or disconnected from smartphone's ground 338. In an exemplary embodiment of the invention, the grounds are connected through connector 142. Additionally or alternatively, grounds of smartphone 100 and add-on device 200 are connected using conduction 252 with case 110 of the smartphone.

Figure 10B:
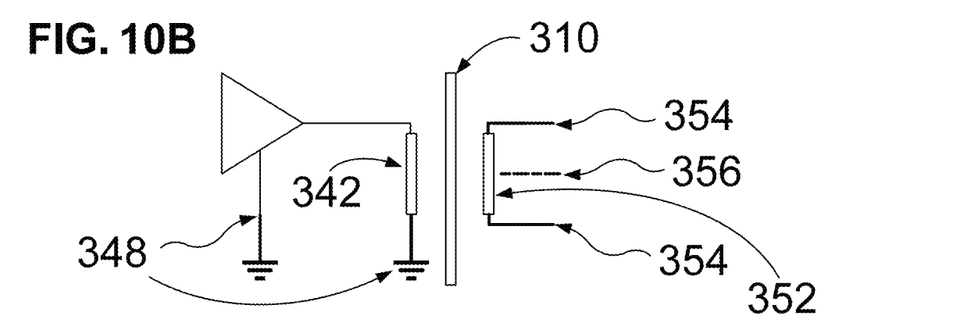
FIG. 10B is a schematic diagram illustrating an inductive approach, in accordance to the present invention.

FIG. 10B is a schematic diagram of inductive, i.e., magnetic, induction approach. The non-conductive gap between smartphone 100 and add-on device 200 is represented by element 310. The RF feed of wireless communication module 220 is connected to conductive element 342, e.g., a wire, that is located in proximity to gap 310. Ground 348 of wireless communication module 220 may be connected to the other end of conductive element 342 to establish a current loop. In the side of the smartphone, there is conductive element 352 that establish an inductive (magnetic/current flow) coupling with element 342. Element 352 may transfer the RF power from element 342 to other elements in smartphone's antenna system 130 by conduction 354 (e.g., using the current induced between the sides of wire 352) or induction 356. Ground 348 of wireless communication module 220 may be connected or disconnected from smartphone's ground.

Figure 10C:
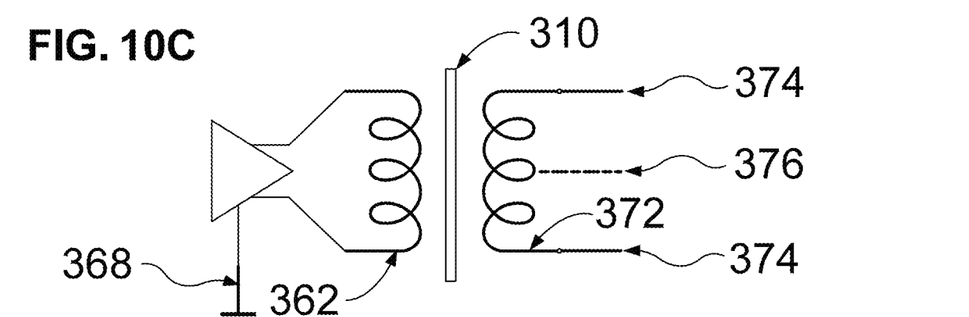
FIG. 10C is a schematic diagram illustrating another inductive approach, in accordance to the present invention.

FIG. 10C is a schematic diagram of another induction approach (i.e., electromagnetic). The non-conductive gap between smartphone 100 and add-on device 200 is represented by element 310.

The RF feed of wireless communication module 220 is connected to coil 362 that is located in proximity to gap 310. The RF feed is balanced, e.g., having differential (i.e., two ports) RF feed, to drive coil 362. In the side of the smartphone, there is coil 372 that establish an inductive (magnetic/current) coupling with element 362. Element 372 may transfer the RF power from element 362 to other elements in smartphone's antenna system 130 by conduction 374 or induction 376. Ground 368 of wireless communication module 220 may be connected or disconnected (more probable in this case) from smartphone's ground.

Figure 10D:
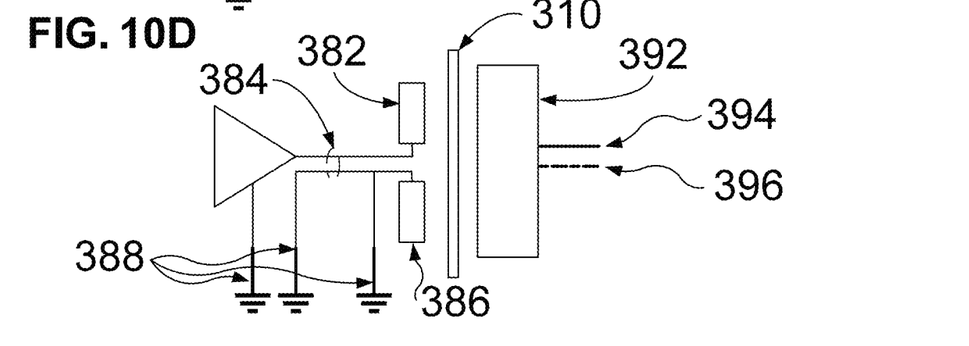
FIG. 10D is a schematic diagram illustrating an electromagnetic induction approach, in accordance to the present invention.

FIG. 10D is a schematic diagram of an electromagnetic induction approach. The non-conductive gap between smartphone 100 and add-on device 200 is represented by element 310. The RF feed of wireless communication module 220 is connected to conductive element 382 that is located in proximity to gap 310 through transmission line 384. The far end ground of transmission line 384 is connected to conductive element 386. The RF feed and the transmission line are unbalanced. In the side of the smartphone, there is element 392 that establish an inductive (or in general an electromagnetic) coupling with elements 382 and 386. Element 392 may transfer the RF energy from elements 382 and 386 to other elements in smartphone's antenna system 130 by conduction 394 or induction 396. Ground 388 of wireless communication module 220 may be connected or disconnected from smartphone's ground. Elements 382 and 386 may act as coupling antenna that transfer electromagnetic energy to the main antenna in smartphone's antenna system 130.

In an exemplary embodiment of the invention, the elements contain capacitors, inductors, coils or the like to from a short, i.e., much shorter than a quarter of a wavelength antenna. In another exemplary embodiment of the invention, elements 382 and 384 are integrated into a single IC that have internal 3D geometry to form a power efficient antenna. In general, elements 382 and 386 are used to provide a general electromagnetic (i.e., combination of electric field and magnetic field) coupling. Element 392 may be an antenna of the smartphone or any other general one or more elements that are coupled by induction to elements 382 and 386.

The examples of FIGS. 10A-10D are non-limiting and non-exhaustive examples and it should be obvious to a person skilled in the art to make other approach of RF energy induction coupling, to combine the above examples and to implement the coupling in various way. In specific, the examples are shown in the context of RF signal transmission from add-on device 200 to smartphone 100, but it should be obvious to a person skilled in the art that by changing the RF amplifier feed to LNA input, the same approaches may be used for reception of RF signals by add-on device 200. Transceiver (both transmit and receive) architectures may be implemented using additional components such as RF switches, circulators, diplexers, filters and any RF front end components that are used in the art. Other components, such as RF baluns, RF components such as lumped capacitors and inductors, traces, layers and other printed elements on PCB and the like, may be used.

These examples may also obviously expand to support a plurality of frequency bands and plurality of antennas by multiplying and sharing these basic approaches presented in FIG. 10. It is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

It is to be understood that the invention is not necessarily limited in its application to the details of the exemplary smartphone and/or methods set forth in the following description and/or illustrated in the drawings is capable of embodied in other embodiments or of being practiced or carried out in various types of smartphones.

It is expected that during the life of a patent maturing from this application many relevant antenna couplers will be developed and the scope of the term antenna coupler is intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A wireless communication system comprising:
   a smartphone comprising an antenna system configured to transmit and receive Radio Frequency (RF) communication signals by electromagnetic radiation; and
   an add-on device that is configured to be attached to the smartphone, wherein, the add-on device comprises,
      a wireless communication module configured to perform at least one of (1) converting digital data to RF communication signals for data transmission, and (2) converting RF communication signals to digital data for data reception, and
      an antenna coupling system that couples between the wireless communication module and the antenna system in order to at least transmit or receive the RF communication signals of the wireless communication module by the antenna system of the smartphone, whereby the add-on device, which lacks any antennas, uses the antennas of the antenna sysetm, which are integrated in the smartphone, in order to communicate with devices other than the smartphone, the antenna coupling system couples the RF communication signals by at least one of
      (a) conduction by galvanic coupling with the enclosure of the smartphone, and
      (b) induction between the add-on device and the smartphone, wherein the induction is performed using at least one of electric field and magnetic field.

2. The wireless communication system of claim 1, wherein the add-on device is a security device comprises a cryptographic module able to encrypt or decrypt data.

3. The wireless communication system of claim 1, wherein the antenna coupling system comprises one or more pogo pins connected to a conductive rim of the smartphone.

4. The wireless communication system of claim 1, wherein the induction coupling comprises induction to at least one of conductive elements of the smartphone enclosure, and conductive elements of the antenna system.

5. The wireless communication system of claim 1, wherein the add-on device's wireless communication module supports one or more RF communication signals ports.

6. The wireless communication system of claim 1, wherein the add-on device's wireless communication module supports a plurality of frequency bands.

7. The wireless communication system of claim 1, wherein a matching subsystem is connected between the wireless communication module and the antenna coupling system in order to reduce the return losses of the transmitted RF communication signals.

8. The wireless communication system of claim 1, wherein the smartphone and the add-on device share ground via an interface connector of the smartphone.

9. The wireless communication system of claim 1, wherein the smartphone and the add-on device share ground via conduction with the enclosure of the smartphone.

10. The wireless communication system of claim 1, wherein the smartphone and the add-on device do not share ground.

11. The wireless communication system of claim 1, wherein the add-on device is a jacket, shell or envelope.

12. The wireless communication system of claim 1, wherein the smartphone comprises $4^{th}$ or higher generation cellular communication and the add-on device comprises $5^{th}$ or higher generation cellular communication.

13. An add-on device for a smartphone comprising an antenna system configured to transmit and receive Radio Frequency (RF) communication signals by electromagnetic radiation, the add-on device is configured to be attached to the smartphone and comprises:
    a wireless communication module to perform at least one of (1) converting digital data to RF communication signals for data transmission, and (2) converting RF communication signals to digital data for data reception; and
    an antenna coupling system that couples between the wireless communication module and the antenna system in order to at least transmit or receive the RF communication signals of the wireless communication module by the antenna system of the smartphone, whereby the add-on device, which lacks any antennas, uses the antennas of the antenna system, which are integrated in the smartphone, in order to communicate with devices other than the smartphone, the antenna coupling system couples the RF communication signals by at least one of
    (a) conduction by galvanic coupling with the enclosure of the smartphone, and
    (b) induction between the add-on device and the smartphone, wherein the induction is performed using at least one of electric field and magnetic field.

14. The add-on device of claim 13, wherein the smartphone comprises $4^{th}$ or higher generation cellular communication and the add-on device comprises $5^{th}$ or higher generation cellular communication.

15. The add-on device of claim 13, wherein the add-on device is a security device comprises a cryptographic module able to encrypt or decrypt data.

16. The add-on device of claim 13, wherein antenna coupling system comprises one or more pogo pins connected to a conductive rim of the smartphone.

17. The add-on device of claim 13, wherein the induction coupling comprises induction to at least one of conductive elements of the smartphone enclosure, and conductive elements of the antenna system.

18. The add-on device of claim 13, wherein the add-on device's wireless communication module supports one or more RF communication signals.

19. The add-on device of claim 13, wherein the add-on device's wireless communication module supports a plurality of frequency bands.

20. The add-on device of claim 13, wherein a matching subsystem is connected between the wireless communication module and the antenna coupling system in order to reduce the return losses of the transmitted RF communication signals.

21. The add-on device of claim 13, wherein the smartphone and the add-on device share ground via an interface connector of the smartphone.

22. The add-on device of claim 13, wherein the smartphone and the add-on device share ground via conduction with the enclosure of the smartphone.

23. The add-on device of claim 13, wherein the smartphone and the add-on device do not share ground.

24. The add-on device of claim 13, wherein the add-on device is a jacket, shell or envelope.

25. A method for using an antenna system of a smartphone by an add-on device that is configured to be attached to the smartphone, wherein the antenna system is configured to transmit and receive Radio Frequency (RF) communication signals by electromagnetic radiation, wherein the add-on device comprises a wireless communication module configured to perform at least one of (1) convering digital data to RF communication signals for data transmission, and (2) converting RF communication signals to digital data for data reception; and an antenna coupling system, the method comprising:

performing at least one of
(1) transmitting RF communication signals from wireless communication module to the antenna coupling system, and
(2) receiving RF communication signals from the antenna coupling system to the wireless communication module; and coupling between the wireless communication module and the antenna system of the smartphone by at least one of
(a) conduction by galvanic coupling with the enclosure of the smartphone, and
(b) induction between the add-on device and the smartphone, wherein the induction is performed using at least one of electric field and magnetic field, whereby the add-on device, which lacks any antennas, uses the antennas of the antenna system, which are integrated in the phartphone, in order to communicate with devices other than the smartphone.

26. The method of claim 25, wherein the add-on device is a security device comprises a cryptographic module able to encrypt or decrypt data.

27. The method of claim 25, wherein antenna coupling system comprises one or more pogo pins connected to a conductive rim of the smartphone.

28. The method of claim 25, wherein the induction coupling comprises induction to at least one of conductive elements of the smartphone enclosure, and conductive elements of the antenna system.

29. The method of claim 25, wherein the add-on device's wireless communication module supports one or more RF communication signals.

30. The method of claim 25, wherein the add-on device's wireless communication module supports a plurality of frequency bands.

31. The method of claim 25, wherein the add-on device further comprises a matching subsystem, wherein the matching subsystem is connected between the wireless communication module and the antenna coupling system in order to reduce the return losses of the transmitted RF communication signals.

32. The method of claim 25, wherein the smartphone and the add-on device share ground via an interface connector of the smartphone.

33. The method of claim 25, wherein the smartphone and the add-on device share ground via conduction with the enclosure of the smartphone.

34. The method of claim 25, wherein the smartphone and the add-on device do not share ground.

35. The method of claim 25, wherein the add-on device is a jacket, shell or envelope.

36. The method of claim 25, wherein the smartphone comprises $4^{th}$ generation cellular communication and the add-on device comprises $5^{th}$ generation or higher cellular communication.

* * * * *